(12) United States Patent
Virdhagriswaran

(10) Patent No.: US 8,892,452 B2
(45) Date of Patent: *Nov. 18, 2014

(54) SYSTEMS AND METHODS FOR ADJUSTING INSURANCE WORKFLOW

(71) Applicant: Hartford Fire Insurance Company, Hartford, CT (US)

(72) Inventor: Sankar Virdhagriswaran, Boxborough, MA (US)

(73) Assignee: Hartford Fire Insurance Company, Hartford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/673,013

(22) Filed: Nov. 9, 2012

(65) Prior Publication Data
US 2013/0073322 A1 Mar. 21, 2013

Related U.S. Application Data

(63) Continuation of application No. 12/693,297, filed on Jan. 25, 2010, now Pat. No. 8,355,934.

(51) Int. Cl.
*G06Q 40/00* (2012.01)
(52) U.S. Cl.
USPC .................................. 705/4; 705/7.29; 705/35
(58) Field of Classification Search
USPC ............................................. 705/4, 7.29, 35
See application file for complete search history.

(56) References Cited

U.S. PATENT DOCUMENTS

| | | | | |
|---|---|---|---|---|
| 5,613,072 A * | 3/1997 | Hammond et al. | ................ | 705/4 |
| 5,664,109 A * | 9/1997 | Johnson et al. | ..................... | 705/2 |
| 5,712,984 A * | 1/1998 | Hammond et al. | ................ | 705/4 |
| 5,796,932 A * | 8/1998 | Fox et al. | ........................ | 715/700 |
| 5,819,226 A * | 10/1998 | Gopinathan et al. | ............ | 705/44 |
| 5,926,800 A * | 7/1999 | Baronowski et al. | ............ | 705/35 |
| 5,930,764 A * | 7/1999 | Melchione et al. | ........... | 705/7.29 |
| 5,950,150 A * | 9/1999 | Lloyd et al. | .................... | 702/183 |
| 5,966,695 A * | 10/1999 | Melchione et al. | ........... | 705/7.33 |
| 5,970,464 A * | 10/1999 | Apte et al. | ......................... | 705/4 |
| 5,987,434 A * | 11/1999 | Libman | ......................... | 705/36 R |
| 6,014,632 A * | 1/2000 | Gamble et al. | ..................... | 705/4 |
| 6,067,488 A * | 5/2000 | Tano | ............................ | 701/33.4 |
| 6,078,857 A * | 6/2000 | Jung et al. | ......................... | 701/59 |
| 6,112,225 A * | 8/2000 | Kraft et al. | ..................... | 709/202 |
| 6,154,658 A * | 11/2000 | Caci | .............................. | 455/466 |

(Continued)

FOREIGN PATENT DOCUMENTS

WO 0113295 A1 2/2001

OTHER PUBLICATIONS

Tkach, Daniel S. Information Mining with the IBM Intelligent Miner Family. (An IBM Software Solutions White Paper) (1998) 30 pages.

(Continued)

*Primary Examiner* — Sara C Hamilton
(74) *Attorney, Agent, or Firm* — Howard IP Law Group, PC

(57) ABSTRACT

Systems and methods are disclosed herein for identifying potential insurance prospects. The potential customers or prospects are identified by determining prospect underwriting affinity scores, prospect affinity scores, and prospect context scores with predictive models. The scores are then combined into a combined prospect score, which is used to adjust insurance underwriting, workflow, and premium determination processes for the prospects.

21 Claims, 10 Drawing Sheets

(56) References Cited

U.S. PATENT DOCUMENTS

| | | | |
|---|---|---|---|
| 6,163,770 A * | 12/2000 | Gamble et al. | 705/4 |
| 6,204,757 B1 * | 3/2001 | Evans et al. | 340/439 |
| 6,246,934 B1 * | 6/2001 | Otake et al. | 701/32.2 |
| 6,438,547 B1 * | 8/2002 | Mehr et al. | 707/999.007 |
| 6,594,579 B1 * | 7/2003 | Lowrey et al. | 701/123 |
| 6,611,740 B2 * | 8/2003 | Lowrey et al. | 701/29.4 |
| 6,643,578 B2 * | 11/2003 | Levine | 701/70 |
| 6,710,738 B2 * | 3/2004 | Allen, Jr. | 342/357.75 |
| 6,756,915 B2 * | 6/2004 | Choi | 340/928 |
| 6,768,417 B2 * | 7/2004 | Kuragaki et al. | 340/425.5 |
| 6,832,141 B2 * | 12/2004 | Skeen et al. | 701/31.4 |
| 6,839,305 B2 * | 1/2005 | Perlman et al. | 368/109 |
| 6,853,956 B2 * | 2/2005 | Ballard et al. | 702/183 |
| 6,868,389 B1 * | 3/2005 | Wilkins et al. | 705/7.29 |
| 6,917,952 B1 * | 7/2005 | Dailey et al. | 1/1 |
| 6,920,379 B2 * | 7/2005 | Miyamoto | 701/1 |
| 6,925,425 B2 * | 8/2005 | Remboski et al. | 702/188 |
| 6,957,133 B1 * | 10/2005 | Hunt et al. | 701/32.4 |
| 6,959,296 B1 * | 10/2005 | Reiss | 1/1 |
| 6,965,326 B2 * | 11/2005 | Allison | 340/999 |
| 6,973,319 B2 * | 12/2005 | Ormson | 455/456.1 |
| 6,977,612 B1 * | 12/2005 | Bennett | 342/357.46 |
| 6,985,922 B1 * | 1/2006 | Bashen et al. | 709/203 |
| 7,007,245 B2 * | 2/2006 | D'Souza et al. | 715/853 |
| 7,035,699 B1 * | 4/2006 | Anderson et al. | 700/90 |
| 7,039,592 B1 * | 5/2006 | Yegge et al. | 705/4 |
| 7,039,654 B1 * | 5/2006 | Eder | 1/1 |
| 7,072,841 B1 * | 7/2006 | Pednault | 705/4 |
| 7,215,255 B2 * | 5/2007 | Grush | 340/932.2 |
| 7,305,364 B2 * | 12/2007 | Nabe et al. | 705/37 |
| 7,392,201 B1 * | 6/2008 | Binns et al. | 705/4 |
| 7,398,218 B1 * | 7/2008 | Bernaski et al. | 705/3 |
| 7,451,065 B2 * | 11/2008 | Pednault et al. | 703/2 |
| 7,542,913 B1 * | 6/2009 | Meek et al. | 705/4 |
| 7,546,243 B2 * | 6/2009 | Kapadia et al. | 705/1.1 |
| 7,562,058 B2 * | 7/2009 | Pinto et al. | 706/21 |
| 7,596,501 B2 * | 9/2009 | Tivey et al. | 705/317 |
| 7,599,842 B2 * | 10/2009 | Tivey et al. | 705/1.1 |
| 7,702,615 B1 * | 4/2010 | Delurgio et al. | 707/781 |
| 7,725,300 B2 * | 5/2010 | Pinto et al. | 703/2 |
| 7,730,003 B2 * | 6/2010 | Pinto et al. | 706/21 |
| 7,818,228 B1 * | 10/2010 | Coulter | 705/35 |
| 7,840,397 B2 * | 11/2010 | Chiou | 703/20 |
| 7,848,949 B1 * | 12/2010 | Delanders et al. | 705/14.49 |
| 7,877,304 B1 * | 1/2011 | Coulter | 705/35 |
| 7,933,762 B2 * | 4/2011 | Pinto et al. | 703/22 |
| 7,945,497 B2 * | 5/2011 | Kenefick et al. | 705/35 |
| 8,060,386 B2 * | 11/2011 | Stevenson et al. | 705/4 |
| 8,165,853 B2 * | 4/2012 | Pinto et al. | 703/2 |
| 8,170,841 B2 * | 5/2012 | Pinto et al. | 703/2 |
| 8,271,349 B1 * | 9/2012 | Mathog | 705/26.4 |
| 8,392,153 B2 * | 3/2013 | Pednault et al. | 703/2 |
| 2001/0020229 A1 * | 9/2001 | Lash | 705/3 |
| 2002/0010598 A1 * | 1/2002 | Johnson et al. | 705/4 |
| 2002/0072958 A1 * | 6/2002 | Yuyama et al. | 705/10 |
| 2002/0099596 A1 * | 7/2002 | Geraghty | 705/10 |
| 2002/0147617 A1 * | 10/2002 | Schoenbaum et al. | 705/4 |
| 2002/0161609 A1 * | 10/2002 | Zizzamia et al. | 705/4 |
| 2002/0173885 A1 * | 11/2002 | Lowrey et al. | 701/29 |
| 2002/0194050 A1 * | 12/2002 | Nabe et al. | 705/10 |
| 2002/0194113 A1 * | 12/2002 | Lof et al. | 705/37 |
| 2002/0194117 A1 * | 12/2002 | Nabe et al. | 705/38 |
| 2002/0198801 A1 * | 12/2002 | Dixon et al. | 705/35 |
| 2003/0028406 A1 * | 2/2003 | Herz et al. | 705/4 |
| 2003/0061075 A1 * | 3/2003 | Heckman et al. | 705/4 |
| 2003/0078788 A1 * | 4/2003 | Sussman et al. | 705/1 |
| 2003/0097330 A1 * | 5/2003 | Hillmer et al. | 705/38 |
| 2003/0101080 A1 * | 5/2003 | Zizzamia et al. | 705/4 |
| 2003/0105651 A1 * | 6/2003 | Gendelman | 705/4 |
| 2003/0167191 A1 * | 9/2003 | Slabonik et al. | 705/4 |
| 2003/0171956 A1 * | 9/2003 | Cox et al. | 705/4 |
| 2003/0176931 A1 * | 9/2003 | Pednault et al. | 700/31 |
| 2004/0049473 A1 * | 3/2004 | Gower et al. | 706/46 |
| 2004/0078243 A1 * | 4/2004 | Fisher | 705/4 |
| 2004/0102980 A1 * | 5/2004 | Reed et al. | 705/1 |
| 2004/0103002 A1 * | 5/2004 | Colley et al. | 705/2 |
| 2004/0103017 A1 * | 5/2004 | Reed et al. | 705/10 |
| 2004/0103051 A1 * | 5/2004 | Reed et al. | 705/36 |
| 2004/0128147 A1 * | 7/2004 | Vallinayagam et al. | 705/1 |
| 2004/0133439 A1 * | 7/2004 | Noetzold et al. | 705/1 |
| 2004/0138927 A1 * | 7/2004 | Eydeland et al. | 705/4 |
| 2004/0143473 A1 * | 7/2004 | Tivey et al. | 705/8 |
| 2004/0143476 A1 * | 7/2004 | Kapadia et al. | 705/9 |
| 2004/0143482 A1 * | 7/2004 | Tivey et al. | 705/10 |
| 2004/0143483 A1 * | 7/2004 | Tivey et al. | 705/10 |
| 2004/0143484 A1 * | 7/2004 | Kapadia et al. | 705/10 |
| 2004/0153362 A1 * | 8/2004 | Bauer et al. | 705/10 |
| 2004/0186753 A1 * | 9/2004 | Kim et al. | 705/4 |
| 2004/0199410 A1 * | 10/2004 | Feyen et al. | 705/4 |
| 2004/0220784 A1 * | 11/2004 | Stephenson et al. | 703/2 |
| 2004/0220837 A1 | 11/2004 | Bonissone et al. | |
| 2004/0220838 A1 * | 11/2004 | Bonissone et al. | 705/4 |
| 2004/0220839 A1 * | 11/2004 | Bonissone et al. | 705/4 |
| 2004/0220840 A1 * | 11/2004 | Bonissone et al. | 705/4 |
| 2004/0220937 A1 * | 11/2004 | Bickford et al. | 707/100 |
| 2004/0230459 A1 * | 11/2004 | Dordick et al. | 705/4 |
| 2004/0236611 A1 * | 11/2004 | Bonissone et al. | 705/4 |
| 2004/0236676 A1 * | 11/2004 | Takezawa et al. | 705/38 |
| 2004/0249557 A1 * | 12/2004 | Harrington et al. | 701/115 |
| 2004/0249679 A1 * | 12/2004 | Henderson et al. | 705/4 |
| 2005/0055248 A1 * | 3/2005 | Helitzer et al. | 705/4 |
| 2005/0055249 A1 * | 3/2005 | Helitzer et al. | 705/4 |
| 2005/0060141 A1 * | 3/2005 | Suzuki et al. | 704/10 |
| 2005/0060207 A1 * | 3/2005 | Weidner et al. | 705/4 |
| 2005/0070299 A1 * | 3/2005 | Caspi et al. | 455/456.1 |
| 2005/0091080 A1 * | 4/2005 | Biats, Jr. | 705/2 |
| 2005/0091085 A1 * | 4/2005 | Colley et al. | 705/4 |
| 2005/0108041 A1 * | 5/2005 | White | 705/1 |
| 2005/0108063 A1 * | 5/2005 | Madill et al. | 705/4 |
| 2005/0108066 A1 * | 5/2005 | Weidner et al. | 705/4 |
| 2005/0125213 A1 * | 6/2005 | Chen et al. | 703/22 |
| 2005/0125259 A1 * | 6/2005 | Annappindi | 705/4 |
| 2005/0131742 A1 * | 6/2005 | Hoffman et al. | 705/4 |
| 2005/0137912 A1 * | 6/2005 | Rao et al. | 705/4 |
| 2005/0159996 A1 * | 7/2005 | Lazarus et al. | 705/10 |
| 2005/0169452 A1 * | 8/2005 | Prigogin et al. | 379/265.01 |
| 2005/0171885 A1 * | 8/2005 | Christman et al. | 705/36 |
| 2005/0177414 A1 * | 8/2005 | Priogin et al. | 705/10 |
| 2005/0192850 A1 * | 9/2005 | Lorenz | 705/4 |
| 2005/0195966 A1 * | 9/2005 | Adar et al. | 379/266.08 |
| 2005/0203828 A1 * | 9/2005 | Lyakovetsky | 705/38 |
| 2005/0222867 A1 * | 10/2005 | Underwood et al. | 705/2 |
| 2005/0228692 A1 * | 10/2005 | Hodgdon | 705/2 |
| 2005/0234742 A1 * | 10/2005 | Hodgdon | 705/2 |
| 2005/0240451 A1 * | 10/2005 | Johnson et al. | 705/4 |
| 2005/0262039 A1 * | 11/2005 | Kreulen et al. | 707/1 |
| 2005/0276401 A1 * | 12/2005 | Madill et al. | 379/114.14 |
| 2006/0009289 A1 * | 1/2006 | McCarten et al. | 463/42 |
| 2006/0015253 A1 * | 1/2006 | Ochs et al. | 702/1 |
| 2006/0015360 A1 * | 1/2006 | Ochs et al. | 705/1 |
| 2006/0015373 A1 * | 1/2006 | Cuypers | 705/4 |
| 2006/0015374 A1 * | 1/2006 | Ochs et al. | 705/4 |
| 2006/0053038 A1 * | 3/2006 | Warren et al. | 705/4 |
| 2006/0064332 A1 * | 3/2006 | Schoenbaum et al. | 705/4 |
| 2006/0122857 A1 * | 6/2006 | DeCotiis et al. | 705/1 |
| 2006/0136273 A1 * | 6/2006 | Zizzamia et al. | 705/4 |
| 2006/0143075 A1 * | 6/2006 | Carr et al. | 705/4 |
| 2006/0187889 A1 * | 8/2006 | Mehta et al. | 370/338 |
| 2006/0242046 A1 * | 10/2006 | Haggerty et al. | 705/35 |
| 2006/0259333 A1 * | 11/2006 | Pyburn et al. | 705/4 |
| 2006/0287892 A1 * | 12/2006 | Jones et al. | 705/4 |
| 2007/0016500 A1 * | 1/2007 | Chatterji et al. | 705/35 |
| 2007/0016508 A1 * | 1/2007 | Lapointe et al. | 705/37 |
| 2007/0016542 A1 * | 1/2007 | Rosauer et al. | 706/21 |
| 2007/0021987 A1 * | 1/2007 | Binns et al. | 705/4 |
| 2007/0027725 A1 * | 2/2007 | Dirnberger et al. | 705/4 |
| 2007/0027726 A1 * | 2/2007 | Warren et al. | 705/4 |
| 2007/0042662 A1 * | 2/2007 | Noelle et al. | 442/327 |
| 2007/0043656 A1 * | 2/2007 | Lancaster | 705/38 |
| 2007/0043662 A1 | 2/2007 | Lancaster | |
| 2007/0078869 A1 * | 4/2007 | Carr et al. | 707/100 |
| 2007/0100669 A1 * | 5/2007 | Wargin et al. | 705/4 |
| 2007/0106539 A1 * | 5/2007 | Gay | 705/4 |
| 2007/0118399 A1 * | 5/2007 | Avinash et al. | 705/2 |

(56) References Cited

U.S. PATENT DOCUMENTS

| | | | | |
|---|---|---|---|---|
| 2008/0040676 | A1* | 2/2008 | Garg et al. | 715/762 |
| 2008/0071606 | A1* | 3/2008 | Whiteley et al. | 705/10 |
| 2008/0126138 | A1* | 5/2008 | Cherney et al. | 705/4 |
| 2008/0154651 | A1* | 6/2008 | Kenefick et al. | 705/4 |
| 2008/0195425 | A1* | 8/2008 | Haggerty et al. | 705/4 |
| 2008/0208651 | A1* | 8/2008 | Johnston et al. | 705/7 |
| 2008/0221934 | A1* | 9/2008 | Megdal et al. | 705/4 |
| 2008/0236177 | A1* | 10/2008 | Senba et al. | 62/157 |
| 2008/0306848 | A1* | 12/2008 | Bartholomew et al. | 705/35 |
| 2008/0313018 | A1* | 12/2008 | Kamm et al. | 705/10 |
| 2009/0006159 | A1* | 1/2009 | Mohr et al. | 705/7 |
| 2009/0030864 | A1* | 1/2009 | Pednault et al. | 706/45 |
| 2009/0049076 | A1* | 2/2009 | Litzow et al. | 707/102 |
| 2009/0132348 | A1* | 5/2009 | Bria et al. | 705/10 |
| 2009/0164383 | A1* | 6/2009 | Rothman | 705/80 |
| 2009/0192914 | A1* | 7/2009 | Hood et al. | 705/26 |
| 2009/0299854 | A1* | 12/2009 | Olawski et al. | 705/14.53 |
| 2010/0002863 | A1* | 1/2010 | Loftus et al. | 379/265.02 |
| 2010/0010878 | A1* | 1/2010 | Pinto et al. | 705/10 |
| 2010/0017263 | A1* | 1/2010 | Zernik et al. | 705/10 |
| 2010/0023370 | A1* | 1/2010 | Tivey et al. | 705/9 |
| 2010/0049535 | A1* | 2/2010 | Chari et al. | 705/1 |
| 2010/0049538 | A1* | 2/2010 | Frazer et al. | 705/1 |
| 2010/0057548 | A1* | 3/2010 | Edwards | 705/14.13 |
| 2010/0063890 | A1* | 3/2010 | Huckleby | 705/26 |
| 2010/0070346 | A1* | 3/2010 | Davis | 705/10 |
| 2010/0070379 | A1* | 3/2010 | Nepomniashy | 705/26 |
| 2010/0076820 | A1* | 3/2010 | Davis | 705/10 |
| 2010/0114663 | A1* | 5/2010 | Casas et al. | 705/10 |
| 2010/0121684 | A1* | 5/2010 | Morio et al. | 705/10 |
| 2010/0153184 | A1* | 6/2010 | Caffrey et al. | 705/10 |
| 2010/0161379 | A1* | 6/2010 | Bene et al. | 705/10 |
| 2010/0223099 | A1* | 9/2010 | Johnson et al. | 705/10 |
| 2010/0324941 | A1* | 12/2010 | Stevenson et al. | 705/4 |
| 2011/0055000 | A1* | 3/2011 | Zhang et al. | 705/14.43 |
| 2011/0153368 | A1* | 6/2011 | Pierre et al. | 705/4 |
| 2011/0153419 | A1* | 6/2011 | Hall, III | 705/14.52 |
| 2011/0184801 | A1* | 7/2011 | Zucker et al. | 705/14.42 |
| 2011/0208566 | A1* | 8/2011 | Lee | 705/7.39 |

OTHER PUBLICATIONS

Stehno, Chris E. What We Have Learned in the Last 50 Years—and Aren't Using. Health Watch. Issue 52, pp. 18-21. (May 2006).

Steed, Judy. Winning Ways. Toronto Star, 4 pages, (May 21, 2007).

Roberts, Jack. Risk & Insurance. Fighting CAT risk creep. 18:8, p. 26(2). (2007).

Predictive Modeling—Current Practices and Future Applications. Record, 30:1. Spring Meeting, Anaheim, CA. Session 64PD. (May 2004) 20 pages.

Bardis et al. Considerations Regarding Standards of Materiality in Estimates of Outstanding Liabilities. Casualty Actuarial Society Forum. (Fall 2006) 65 pages.

Predictive Modeling Applications. Weyuker, L. & Minnich, J. RECORD, 31:2. New Orleans Health/Pension Spring Meeting, Session 3PD. (Jun. 2005) 17 pages.

Popowich, Fred. Using Text Mining and Natural Language Processing for Health Care Claims Processing. SIGKDD Explorations. 7:1, 59-66 (Jun. 2005).

Phua, C. et al. A Comprehensive Survey of Data Mining-based Fraud Detection Research. Paper (9/22/005) 14 pages.

Monsour, Christopher. Presentation: What is Predictive Modeling? (2005) 80 pages.

Management and Data Quality Texts. Casualty Actuarial Society Forum, pp. 273-306. (Winter 2007).

Francis, Louise A. Taming Text: An Introduction to Text Mining. Casualty Actuarial Society Forum. pp. 51-88 (Winter 2006).

Francis Analytics and Actuarial Data Mining. Predictive Modeling Workshop presentation: Training for development and deployment. At least as early as Oct. 25, 2010. 13 pages.

Bolstad, W. M. Introduction to Bayesian Statistics. A. John Wiley & Sons. 2nd ed. 2007. 450 pages.

de Ville, Barry. Decision Trees for Business Intelligence and Data Mining Using SAS Enterprise Miner. SAS Press Series. 2006. 243 pages.

D'Arcy, Stephen P. Predictive Modeling in Automobile Insurance: A Preliminary Analysis. Paper presented at World Risk and Insurance Economics Congress. Aug. 2005. 33 pages.

Derrig et al. Comparison of Methods and Software for Modeling Nonlinear Dependencies: A Fraud Application. (2006). 25 pages.

Grimes, Seth. The Word on Text Mining. Presentation. Portals, Collaboration, and Content Management. (Apr. 14, 2005). 32 pages.

Pednault et al. IBM Research Report RC-21757. The Importance of Estimation Errors in Cost-Sensitive Learning. (May 30, 2000) 7 pages.

Rosenberg et al. Predictive Modeling with Longitudinal Data: A Case Study of Wisconsin Nursing Homes. School of Business, University of Wisconsin (Feb. 4, 2006). 23 pages.

Hong, S.J. et al. IBM Research Report RC-21570. Advances in Predictive Model Generation for Data Mining. (1999). 18 pages.

Woodfield, Terry J. Paper 071-30. Predicting Workers' Compensation Insurance Fraud Using SAS Enterprise Miner 5.1 and SAS Text Miner. 2004. 6 pages.

Yan, et al. "Designing a Neural Network Decision System for Automated Insurance Underwriting," Int'l. Joint Conference on Neural Networks, pp. 1-8 (Jul. 2006).

Pednault et al. IBM Research Report RC-21731. Handling Imbalanced Data Sets in Insurance Risk Modeling. (Mar. 10, 2000). 6 pages.

Woodfield, Terry J. Paper 13-26. Predictive Modeling in the Insurance Industry Using SAS Software. (2001). 5 pages.

Muller, Stacey. Predictive Modeling: Using Claims Data to Find Trends and Cost Drivers. Milliman Consultant's Corner. At least as early as Sep. 4, 2003. 3 pages.

Axelrod et al. Predictive Modeling in Health Plans. Abstract from Disease Management & Health Outcomes, 11:779-787(9). (Nov. 2003).

Wu et al. Paper. Does Credit Score Really Explain Insurance Losses? Multivariate Analysis from a Data Mining Point of View. Casualty Actuarial Society Forum. 2003. pp. 113-138.

Conger et al. Emphasis Apr. 2006. Predictive Modeling in Workers Compensation. pp. 18-21.

Apte et al. Data-intensive analytics for predictive modeling. IBM Journal of Research and Development. 47:1, 17-23 (Jan. 2003).

Apte et al. A probabilistic estimation framework for predictive modeling analytics. IBM Systems Journal. 41:3, 438-48. (2002).

Deloitte & Touche. Advanced analytics and the art of underwriting: Transforming the insurance industry. 12 pages.

Magnify Press Release. Magnify Applies Predictive Modeling to Worker's Comp Underwriting and Fraud Detection. Chicago, IL (Mar. 1, 2005). 2 pages.

Mosley, R. The Use of Predictive Modeling in the Insurance Industry. Pinnacle Actuarial Resources Inc. (Jan. 2005) 4 pages.

Rosella Data Mining & Database Analytics. Downloaded from www.roselladb.com/insurance-risk-analysis.htm. At least as early as Sep. 3, 2003. 6 pages.

Guszcza et al. Predictive Modeling for Property-Casualty Insurance. Presentation to SoCal Actuarial Club. (Sep. 22, 2004). 40 pages.

Ellingsworth et al. DM Review. Text Mining Improves Business Intelligence and Predictive Modeling in Insurance. (Jul. 2003). 5 pages.

Magnify Press Release. Erie Insurance Reduces Fraud Losses with FraudFocus—Predictive Modeling Demonstrates Effectiveness for Auto, Property and Worker's Comp. (Feb. 4, 2005). 2 pages.

Table of Contents of White Paper. Predictive Modeling in Insurance: An insurance industry executive briefing. SAS (Predictive Modeling in Insurance), publisher. (Mar. 23, 2007). 2 pages.

Rosella Data Mining & Predictive Analytics. Predicting Modeling Software. Downloaded from www.roselladb.com/predictive-modeling.htm. At least as early as Sep. 3, 2003. 5 pages.

Guven, Serhat. Predictive Modeling. Future Fellows. (Jun. 2006). 3 pages.

Predictive Modeling. Record, 28:2. Spring Meeting, San Francisco, CA. Session 99OF. (Jun. 2002) 20 pages.

(56) References Cited

OTHER PUBLICATIONS

Antonio et al. North American Actuarial Journal. 10:1, 30-48. Log-normal Mixed Models for Reported Claims Reserves. (Jan. 2006).
Young, Virginia R. Actuarial Research Clearing House. vol. 1. Robust Bayesian Credibility Using Semiparametric Models. (1999).
Macleod et al. Paper. Entropy-Reducing Properties of Predictive Financial Models. Aug. 27, 1992. Actuarial Research Clearing House. vol. 3 (1993) 25 pages.
Morgan et al. Conjugate Bayesian Analysis of the Negative Binomial Distribution. Actuarial Research Clearing House. vol. 1, pp. 97-118, (1993).
Sharp, Keith P. Aspects of Interest Rate Models. Actuarial Research Clearing House. vol. 1, pp. 433-457. (Aug. 25, 1990).
Roudebush et al. Converting Clinical Literature to an Insured Population: A Comparison of Models Using NHANES. No. Ameri. Actuarial J. 6:4, 55-66. (2002).
Fellingham et al. Comparing Credibility Estimates of Health Insurance Claims Costs. No. Ameri. Actuarial J. 9:1, 1-12. (2005).
de Alba, Enrique. Bayesian Estimation of Outstanding Claims Reserves. No. Ameri. Actuarial J. 6:4, 1-20. (2002).
Ellis et al. Applying Diagnosis-Based Predictive Models to Group Underwriting. Society of Actuaries, Issue 46, 1-7. (Aug. 2003).
Wolak, Dan. An Actuarial Response to the Health-Care Crisis. Society of Actuaries. Issue 47, 1-9. (Apr. 2004).
Werner et al. GLM Basic Modeling: Avoiding Common Pitfalls. Casualty Actuarial Society Forum. pp. 257-272. (Winter 2007).
Meyers, Glenn. On Predictive Modeling for Claim Severity. Casualty Actuarial Society Forum. pp. 215-253. (Spring 2005).
CAS Data Management and Information Educational Materials Working Party. Survey of Data Management and Data Quality Texts. Casualty Actuarial Society Forum, pp. 273-306. (Winter 2007).
Sanche et al. Variable Reduction for Predictive Modeling with Clustering. Casualty Actuarial Society Forum, pp. 89-100. (Winter 2006).
Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).
Predictive Modeling Raises Opportunities and Issues for Actuaries and Insurers, CAS Annual Meeting is Told. Insurance Newscast (Dec. 15, 2005) 2 pages.
Wang, Wei. Predictive Modeling Based on Classification and Pattern Matching Methods. Thesis. (May 1999) 134 pages.
Deloitte & Touche. Presentation Predictive Modeling for Claims: The New Claim Frontier (2006) 31 pages.
Derrig, R. et al. Distinguishing the Forest from the TREES: A Comparison of Tree Based Data Mining Methods. Casualty Actuarial Society Forum. pp. 1-49 (Winter 2006).
Fetterolf, Don. Paradise Lost: Return on Investment in Disease Management. Health Watch. Issue 52, pp. 14-17. (May 2006).
Monsour, Christopher. Presentation: Discrete Predictive Modeling. Casualty Actuarial Society. Special Interest Seminar on Predictive Modeling. (Oct. 5, 2004) 82 pages.

\* cited by examiner

SYSTEMS AND METHODS FOR ADJUSTING INSURANCE WORKFLOW

CROSS-REFERENCE TO RELATED APPLICATIONS

This is a continuation application of and claims priority to and benefit of copending U.S. patent application Ser. No. 12/693,297 filed Jan. 25, 2010, entitled Systems And Methods For Prospecting Business Insurance Customers, the entirety of the foregoing application being hereby incorporated by reference herein for all purposes.

BACKGROUND OF THE INVENTION

Insurance companies and insurers are interested in identifying prospects such as new leads or existing customers to whom they can sell multiple lines of personal or business insurance coverage, such as property coverage, general liability coverage, and workers compensation coverage.

Today, identifying prospects is done using simple criteria, such as zip code and industry. While these simple criteria may reflect broad interests of the insurance companies, e.g., where they are interested in expanding their business, these criteria are not related to how likely a prospect is to purchase new or multiple lines of insurance coverage. Moreover, these criteria disregard the more complex, detailed prospect criteria that may be important to insurance companies.

SUMMARY OF THE INVENTION

Systems and methods are disclosed herein for identifying potential insurance prospects, such as new leads or existing insurance customers. The potential prospects are identified by determining prospect underwriting affinity scores, prospect affinity scores, and prospect context scores with predictive models. The scores are then combined into a combined prospect score, which is used to adjust insurance underwriting, workflow, and premium determination processes for the prospects.

In one aspect, the invention relates to a computerized method for an insurance company to adjust an insurance process. The method includes receiving identification at least one prospect and retrieving information associated with the prospect from a database. The method also includes determining, by a predictive model executing on a processor, a prospect underwriting affinity score representative of the likelihood that insurance will be offered to the at least one prospect, based on the retrieved information, determining, by a predictive model executing on a processor, a prospect affinity score representative of the likelihood that the prospect will accept an insurance offer, based on the retrieved information, determining, by a predictive model executing on a processor, a combined prospect score based at least partly on the prospect underwriting affinity score and the prospect affinity score, and adjusting, by a processor, an insurance workflow process based on the combined prospect score.

In one embodiment, the method includes determining a context score based on the retrieved information and determining the combined prospect score based at least partly on the prospect underwriting affinity score, the prospect affinity score, and the context score. Optionally, the method includes determining the context score based on the retrieved information by determining the context score with a predictive model. In certain embodiments, the method includes receiving identification of the at least one prospect by receiving a telephonic inquiry from the prospect(s) and adjusting the insurance workflow process by electronically outputting a score and/or electronically outputting a recommended action to a customer service representative in contact with the at least one prospect. In some embodiments, the method includes receiving identification of the prospect(s) by receiving an online inquiry from the prospect(s) and adjusting an insurance workflow process by modifying an online interface being displayed to the prospect(s). Optionally, the method may include receiving identification of the prospect(s) by receiving information about the prospect(s) from one or more third party agents.

In some embodiments, the predictive models include a logistic regression model, a hierarchical regression tree model, and/or a supervised learning model. The method may include generating prospect rankings based at least partly on the combined prospect score. In some embodiments, the processor(s) may be located at a location associated with a third party agent and remote from the insurance company. In these embodiments, the third party agent stores at least a subset of the prospect parameters in the database, the insurance company cannot directly access the subset of the prospect parameters, and the third party agent cannot directly access at least one predictive model. Optionally, the method may include determining the prospect affinity score based on quote flow information.

In another aspect, the invention relates to a system for adjusting an insurance process, as described above. The system includes a database and at least one processor configured to adjust an insurance process, as described above.

In yet another aspect, the invention relates to a computer readable medium storing computer executable instructions, which, when executed on a processor, cause the processor to carry out a method for adjusting an insurance process, as described above.

BRIEF DESCRIPTION OF THE FIGURES

The methods and systems may be better understood from the following illustrative description with reference to the following drawings in which.

DETAILED DESCRIPTION

To provide an overall understanding of the invention, certain illustrative embodiments will now be described, including systems and methods for identifying potential insurance prospects, such as new leads or existing insurance customers who may be interested in additional insurance products. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
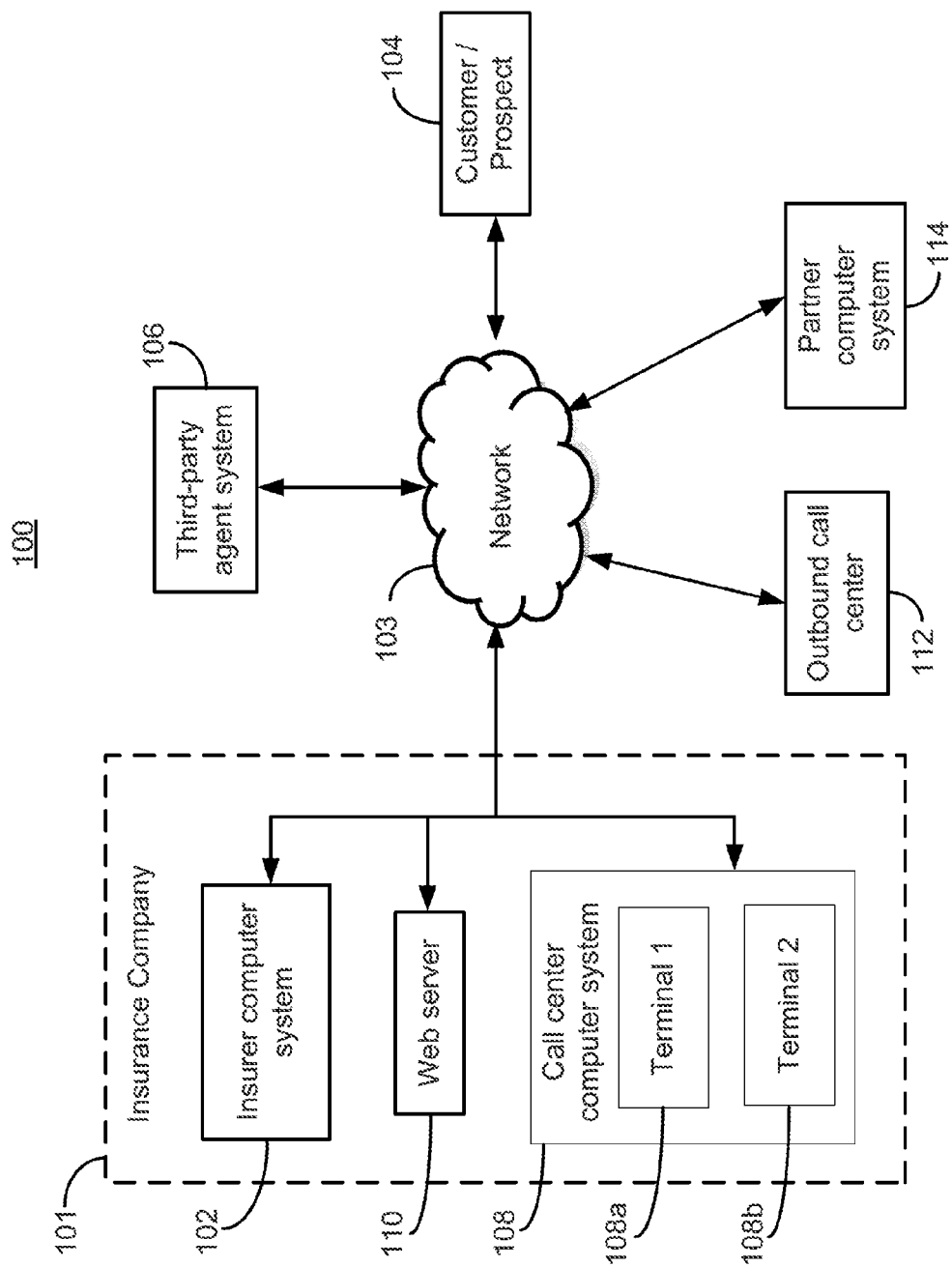
FIG. 1 is a block diagram of an insurance computer network, according to an illustrative embodiment of the invention.

FIG. 1 is a block diagram of an insurance computer network 100, according to an illustrative embodiment of the invention. The insurance computer network 100 includes an insurance company 101 with an insurer computer system 102, a call center computer system 108, and a web server 110. The call center computer system 108 includes one or more customer service representative terminals 108a and 108b. The customer service representative terminals 108a and 108b may be operated by employees of the insurance company, and are linked to the insurer computer system 102 via the call center computer system 108. The insurance company 101, its computer system 102, the call center computer system 108, and/or its web server 110 are linked, via network 103, to one or more prospects 104, a third-party agent system 106, an outbound call center 112, and a partner computer system 114. The network 103 may be the Internet or a public-switched telephone network (PSTN). For example, as described below in relation to FIG. 6, the insurer computer system 102 may generate a list of prospects for the outbound call center 112, and may transmit the list to the outbound call center 112 via the network 103. The outbound call center 112 may make the outbound calls to, for example, prospect 104, via the same network 103 or a different public network, such as a PSTN. As another example, the third-party agent system 106 may submit quote requests from a prospect to the insurance company 101 via the network 103. As yet another example, as described below in relation to FIG. 9, a black-box software module operating on a partner computer system 114 may transmit calculated prospect scores/rankings to the insurance company 101 and/or insurer computer system 102 via the network 103.

In some embodiments, different networks are used to link different components of the insurance computer network 100 together. For example, the systems associated with the insurance company 101, such as the insurer computer system 102, the web server 110, and the call center computer system 108, may be linked to each other via a private data network. In these embodiments, the insurance company 101 and/or one or more of its components are then linked to external systems and components via a public network such as the Internet or a PSTN. For example, as described below, in relation to FIG. 4, a prospect 104 may place a call to the insurer call center computer system 108 via the public network 103. The call center computer system 108, after receiving the inbound call from the prospect 104, may retrieve relevant prospect information from the insurer computer system 102 via the private data network. Similarly, as described below in relation to FIG. 7, when the prospect 104 accesses a webpage served by the web server 110 on the public network 103, the web server 110 may also retrieve and/or transmit data to the insurer computer system 102 via the private data network.

In other embodiments, the web server 110 and/or the call center computer system 108 may not be part of the insurance company 101. Instead, the web server 110 and/or the call center computer system 108 may be operated by third parties. For example, a third party company may operate both the call center computer system 108 and the outbound call center 112. In certain embodiments, other customer communications systems besides or in addition to the outbound call center 112 may be incorporated into the system. For example, system 100 may include a direct mailing center, an electronic mail marketing system, or a public relations center.

Figure 2:
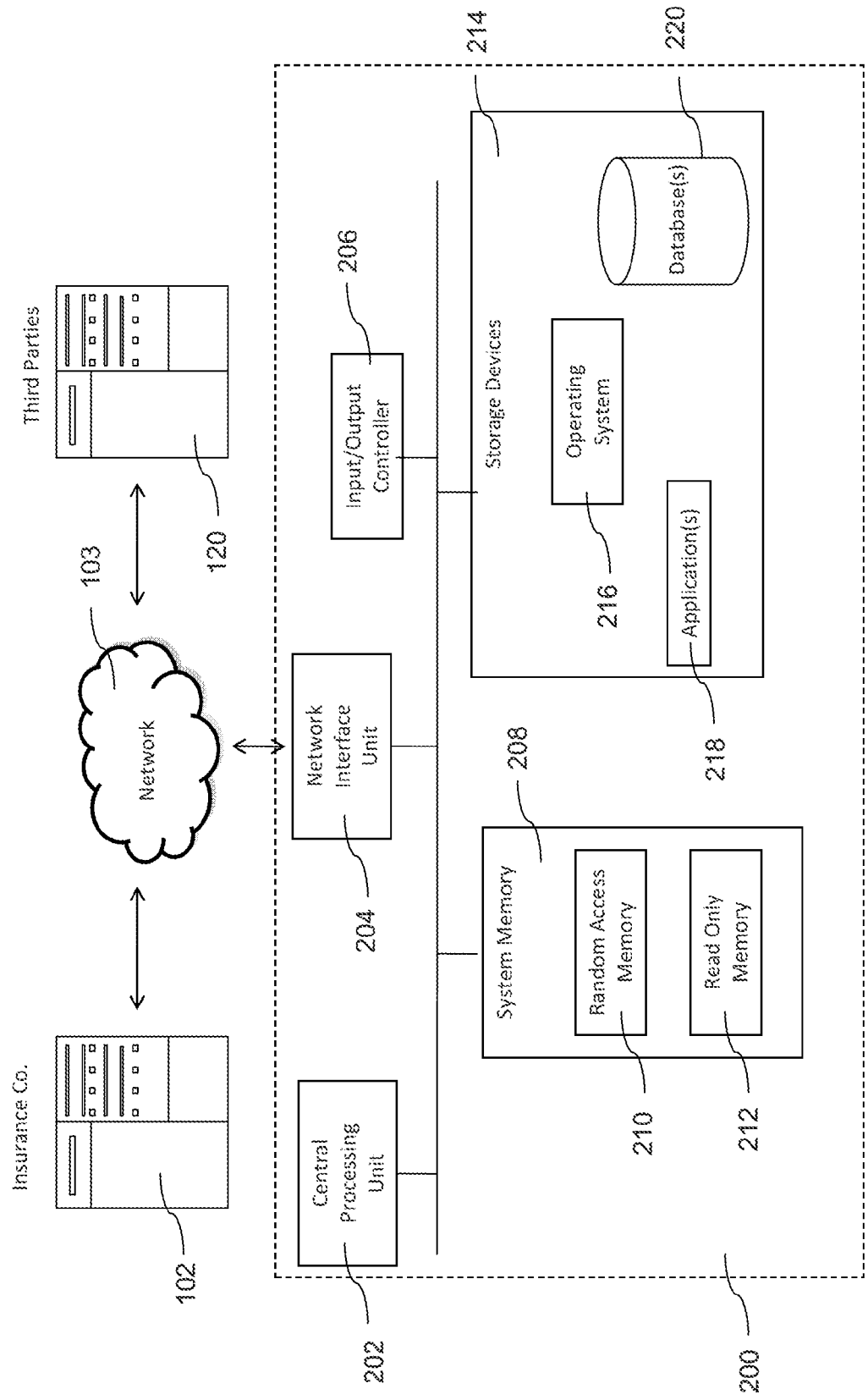
FIG. 2 is a block diagram of a computer system in the insurance computer network of FIG. 1, according to an illustrative embodiment of the invention.

FIG. 2 is a block diagram of a computer system 200 in the insurance computer network of FIG. 1, according to an illustrative embodiment of the invention. Computer system 200 comprises at least one central processing unit (CPU) 202, system memory 208, which includes at least one random access memory (RAM) 210 and at least one read-only memory (ROM) 212, at least one network interface unit 204, an input/output controller 206, and one or more data storage devices 214. All of these latter elements are in communication with the CPU 202 to facilitate the operation of the computer system 200. The computer system 200 may be configured in many different ways. For example, computer system 200 may be a conventional standalone computer or alternatively, the function of computer system 200 may be distributed across multiple computing systems and architectures. In the embodiment shown in FIG. 2, the computer system 200 is linked, via network 103 (also described in FIG. 1), to an insurance company computer system 102 and one or more third party computer systems 120.

Computer system 200 may be configured in a distributed architecture, wherein databases and processors are housed in separate units or locations. Some such units perform primary processing functions and contain at a minimum, a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The data storage device 214 may store, for example, (i) an operating system 216 for the computer system 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as generating dynamic driver profiles, evaluating driver behavior, selecting feedback modes, and generating feedback. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or optomagnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3A:
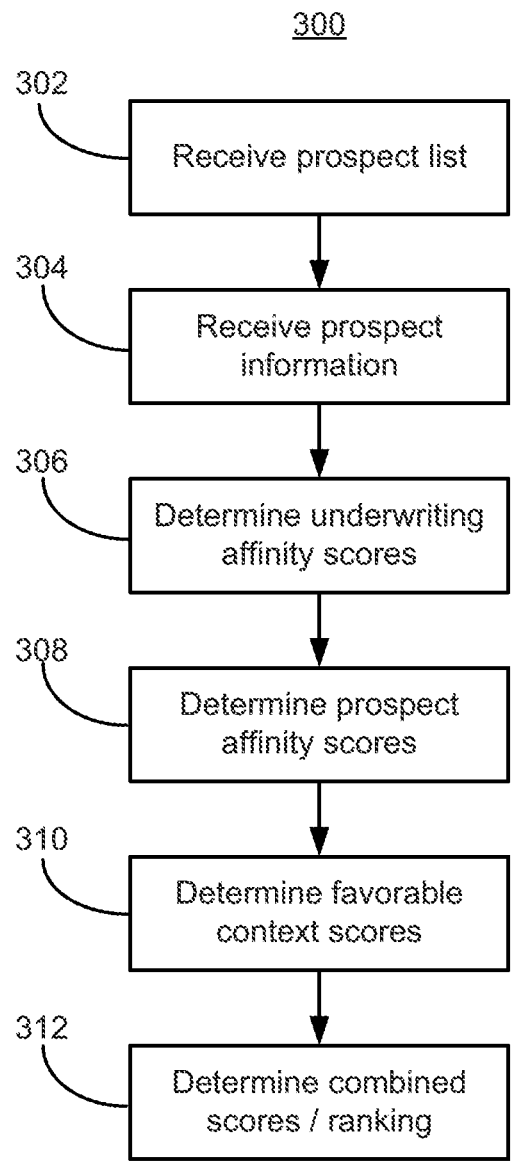
FIG. 3A is a flowchart depicting a process for determining a combined prospect score, according to an illustrative embodiment of the invention.

FIG. 3A is a flowchart depicting a process 300 for determining a combined prospect score, according to an illustrative embodiment of the invention. Process 300 may be performed by, for example, computer systems 102 or 200, described in relation to FIGS. 1 and 2. In step 302, the computer system 102 receives a prospect list or list of potential business insurance prospects compiled from one or more sources. These sources include, without limitation, internal databases, external databases (e.g. government databases), leads provided by partners (e.g., payroll services) or other third-party agents, and leads collected through marketing approaches including but not limited to websites where prospects register interest and/or return cards provided with magazines.

In step 304, the computer system 102 receives information about the prospects on the prospect list received in step 302, from the same sources that supplied the prospect list. In some embodiments, the computer system 102 may cross-reference the prospects on the prospect list with other internal and external information sources, such as internal databases, credit agencies, or third party agents, to obtain prospect information. The prospect information includes the prospect parameters and variables discussed below, in relation to the underwriting affinity scores, the prospect affinity scores, and the favorable context scores described below. The prospects may be business prospects or personal insurance prospects.

In step 306, the computer system 102 determines an underwriting affinity score for each prospect on the prospect list received in step 302. The underwriting affinity score represents the likelihood that insurance will be underwritten for the prospect, and is based on a number of prospect parameters. These prospect parameters include, but are not limited to, the following:

Prospect demographics, such as annual revenue, number of locations, number of employees, prospect industry (in the form of Standard Industrial Classification (SIC) or North American Industry Classification System (NAICS) codes), business location (in the form of addresses or zip codes), company age, company ownership structure;

Potential annual insurance premium

Potential estimated earned insurance premium

Insurance risk scores, representative of the profitability of underwriting insurance to the prospect, based at least in part on prospect financial risk factors;

Characteristics about coverage limits and deductibles across one or more product lines (for example, building coverage limit/deductible, or intellectual property limit/deductible)

The types and capabilities of the channel(s) through which the prospect is being presented (e.g. whether the channel is capable of electronic billing, or monthly upload of payroll data);

Competitiveness, such as submission ratio (number of insurance quotes created by a prospect/agent versus number of submissions made to the agent) and issue ratio (number of submissions received by insurer versus number of policies issued);

Appetite, the desire of the insurer to sell particular insurance products to particular industries in particular geographic locations; and Catastrophic and weather related limits, based on geographic location and/or nearness to landmarks/points of interest.

For prospects that currently have an existing relationship with the insurer, the prospect parameters of interest may further include:

Promptness of payment, e.g. how quickly the prospect pays its premiums;

Filed insurance claims and loss history;

Contacts from the prospect requesting endorsements (changes to existing policies);

Satisfaction with respect to prospect-initiated service and policy-related calls/interactions with the insurer;

Earned insurance premium;

Expected prospect longevity;

Results of prospect audits; and

Conditional probability information related to providing additional product lines when the prospect already has a policy with one or more product lines.

With these parameters, the computer system 102 determines the underwriting affinity score by using a predictive model to determine the probability of issue of a policy for a single product line (e.g., for a new prospect) or of a policy for a multiple product line (e.g., for a prospect that already has an existing policy for a product line). The predictive model may be formed from neural networks, linear regressions, Bayesian networks, Hidden Markov models, or decision trees. The predictive model(s) may be formed, at least in part, using various techniques described in U.S. patent application Ser. No. 11/890,831, filed Aug. 7, 2007, the entirety of which is hereby incorporated by reference.

In one particular embodiment, the computer system 102 uses a linear predictive model based on logistic regression. In this embodiment, the computer system 102 uses a subset of variables, each known to contribute to the insurer's willingness to write policies, to construct the predictive model. The linear predictive model predicts whether or not a particular prospect will be underwritten for a particular product line or for a set of product lines.

In another embodiment, the computer system 102 uses a predictive model based on hierarchical regression tree techniques, such as a classification and regression tree (CART) model. In this embodiment, the computer system 102 uses all potential variables that could contribute to an insurer's ability to write a single product line policy or multiple product line policy to construct the predictive model. The predictive model thus created predicts the probability of issue of a single or multiple product line policy to a prospect, as well as selecting variables that contribute most to underwriting that particular prospect. In other embodiments, the computer system 102 may determine weights for each potential variable, and then either incorporate each of the potential variables into the predictive model according to its weight, or select a subset of the variables to incorporate into the model, such as, for example, the ten variables with the largest weights.

Figure 3B:
FIG. 3B is a table depicting the weights of variables in a predictive model, according to an illustrative embodiment of the invention.

FIG. 3B is a table depicting one suitable set of variables and associated weights used in a predictive model, according to an illustrative embodiment of the invention. Column 320 lists the names of the various variables, such as the total employee count, class code, appetite code, and property deductible amount. Column 322 lists the weight of the corresponding variable in the predictive model, and column 324 is a pictorial representation of the variable weight. The variable weight listed in column 322 may be a scale, percentage, multiplier, or any other value that is representative of the weight of the variable. If the weight of a variable for a particular predictive model is zero, then that variable is not incorporated into the predictive model. The variables and weights depicted in FIG. 3B are merely one illustrative example of a set of variables and weights suitable for use in the predictive models employed by the systems and methods disclosed herein. Alternative variables and weights may be used without departing from the scope of the invention.

In some embodiments, the computer system 102 generates both a linear predictive model and a hierarchical regression tree predictive model with similar sets of input parameters. The computer system 102 then selects the particular model by subjecting the models to model validation tests against one or more sets of historical data. These tests include a minimum mean square error test, in which the total mean square error of all of the parameters in a model are calculated with respect to a set of historical data and then compared to either the total mean square error of another model or to a threshold; a receiver operating characteristic (ROC) test, which determines a ratio of false positives to false negatives for each model with respect to the historical dataset(s); and/or a cross validation test, which compares model performance on a portion of historical data not used in the model determination process. However, in other embodiments, other suitable model validation tests or combinations thereof may be used to select the predictive model.

Referring back to FIG. 3A, in step 308, the computer system 102 determines a prospect affinity score for each prospect on the prospect list received in step 302. The prospect affinity score represents the likelihood that a prospect will be interested in buying a policy with a new product line or with multiple product lines from an insurer, and predicts the conversion probability of a quote into a submission. The computer system 102 generates the prospect affinity score with quote flow data that is generated and/or collected during the flow of potential and actual policy quotes and policies between the insurer, prospects, and any intermediary third party agents. Quote flow information includes, for example, information about policy quotes that were created by a third party agent and/or a prospect and submitted through the insurer's quoting system. Quote flow information also includes information about policy quotes that were converted into submissions by a third party agent and/or a prospect who had expressed interest in purchasing policies from the insurer. Optionally, quote flow information may include price sensitivity parameters, such as price adjustment factors that reflect price sensitivities based on customer characterization. In other embodiments, the computer system 102 may use other prospect parameters to determine prospect affinity scores, such as any of the parameters discussed above, in relation to step 306.

In step 310, the computer system 102 determines a favorable context score for each prospect on the prospect list received in step 302. A prospect context score represents whether an offer of a new or updated insurance policy to the prospect, if made, would be made at an appropriate time and in the appropriate context. The determination of the favorable context score is based on at least two different parameters. The first parameter is a timeliness parameter, and represents whether the time is appropriate for making the policy offer to the prospect. For example, offering a new or updated insurance policy to a prospect when the prospect has a preexisting insurance policy that is about to expire may be timely, whereas the same offer made at a time when the prospect's preexisting policy still has a term of several months may not be timely. Thus, the timeliness parameter may be positive for a prospect with a preexisting insurance policy that is due to expire in two weeks, whereas the timeliness parameter may be negative for a prospect with an insurance policy that is due to expire in nine months. The timeliness parameters are based, as described above, on policy renewal dates (for prospects with policies from the insurer) and policy expiration dates (for prospects with policies from other insurers).

The second parameter is a warmness parameter, and represents whether the context or prospect attitude is appropriate for making the policy offer to the prospect. For example, if a prospect has just contacted the insurer, complaining about poor customer service, the prospect will likely show reduced enthusiasm toward a new or updated policy offer. The warmness parameter is created based on customer satisfaction scores and instances of positive service and sales activities with the prospect within a specified time window, such as favorable audit results, full and timely payment of claims, and endorsement requests for adding insurance coverage and/or adjusting currently existing limits and deductibles upwards. This prospect data may be obtained from, for example, database(s) 220 associated with the insurer computer system 102.

The timeliness and warmness parameters are then combined to form the prospect context score. In one embodiment, the computer system 102 performs the combination using a predictive model, such as a hierarchical regression tree model. In other embodiments, the combination may be performed in part or entirely by an underwriting agent or a customer service agent.

In step 312, a combined score is created from the scores determined in the previous steps. In one embodiment, three sorted or ranked lists of prospects are generated, each by sorting the prospect list received in step 302 according to one of the prospect scores discussed above. Each of the three ranked lists may then be rearranged according to business rules and/or filters. For example, there may be a business directive to focus on selling particular insurance products in a particular geographic location, and it may not be desirable to actually include this directive into the predictive model. Thus, the output ranked lists may be filtered/resorted according to this business directive. As another example, intelligence resulting from late-breaking events in the field may not be able to be incorporated quickly enough into the predictive models, thus necessitating changes in the output ranked lists.

Once the ranked lists have been subject to additional resorting and reranking as appropriate, the lists may be combined and ranked to form a final prospect list, and the final prospect combined scores derived from the most predictive variables/parameters. In one embodiment, this is performed by a predictive model such as LPBoost, which is a supervised learning model. In other embodiments, other predictive models, such as linear regression models, neural networks, and/or hidden Markov models may be used.

Figure 4:
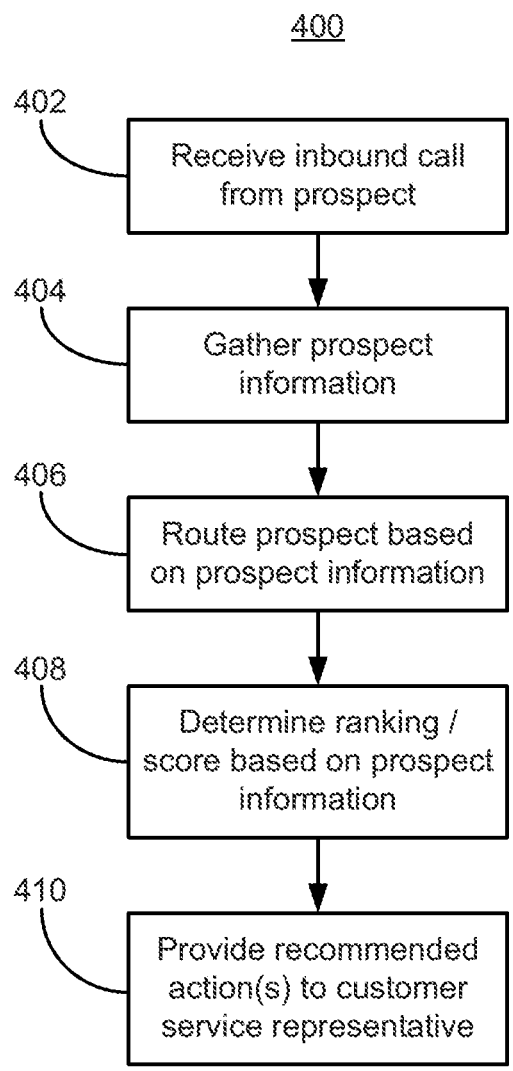
FIG. 4 is a flowchart depicting a workflow process for an inbound prospect call, according to an illustrative embodiment of the invention.

FIG. 4 is a flowchart depicting a workflow process 400 for an inbound prospect call, according to an illustrative embodiment of the invention. Workflow process 400 may be performed by the call center computer system 108 (FIG. 1), in conjunction with the insurer computer system 102 (FIG. 1). In step 402, the computer system 108 may receive an inbound call from a prospect. The computer system 108 gathers information about the prospect making the inbound call in step 404 by, for example, identifying the phone number and/or area code of the inbound call. When the inbound call is received, the computer system 108 may also direct the calling prospect to an automated call routing system, which may be implemented on the computer system 108 or on a different computer system. In these embodiments, the automated call routing system may allow the computer system 108 to gather information from the calling prospect by asking questions via, for example, an interactive voice response (IVR) system. These questions may include, for example, the name of the prospect, the reason for the prospect's call, and where the prospect wishes to be directed. In some embodiments, the computer system 108 may direct the calling prospect to a screening customer service representative who collects prospect information before routing the inbound prospect call appropriately.

After prospect information has been gathered in step 404, the computer system 108 routes the calling prospect to the appropriate customer service representative terminal 108*a*-*b*, based on the gathered information (step 406). For example, if the prospect indicates that the reason for calling is to inquire about a pending claim, the computer system 108 may route the prospect to a customer service terminal in the claims department, or to a terminal assigned to a customer service representative specializing in claims resolution. As another example, if the prospect indicates that the reason for calling is to apply for a particular type of insurance policy, the computer system 108 may route the prospect to the customer service agent with the best record of issuing that particular type of insurance policy.

In step 408, the computer system 108, in conjunction with computer system 102 (FIG. 1), may determine the combined prospect score/ranking of the inbound calling prospect according to the process 300, described in relation to FIG. 3A, based on the information gathered in step 404. In some embodiments, the computer systems 108/102 gathers additional prospect information as needed for the scoring/ranking process. For example, the computer system 108 may prompt the customer service representative to ask the prospect questions to gather the additional information. Optionally, the computer system 108 may retrieve additional information from other sources, such as database(s) 220 (FIG. 2). In other embodiments, the computer systems 108 and/or 102 may automatically generate the additional prospect information required. The additional information may be generated by extrapolating known prospect information, such as information collected from the prospect and/or information retrieved from a database, such as database(s) 220. For example, the computer system 102 may automatically extrapolate an expected premium for a prospect, if the prospect business type (SIC/NAICS code) and geographic location is known. The combined score/ranking and/or the individual scores may include, without limitation, one or more numbers, ranks, categories, tranches, and/or descriptive labels.

Once the combined prospect score/ranking of the prospect has been determined in step 408, the computer systems 108 and/or 102 may provide one or more recommended actions to the customer service representative currently interacting with the prospect (step 410). The computer system 108 may, for example, provide recommended actions to the customer service representative by displaying messages, icons, and/or notifications on the customer service representative terminal 108*a*-*b*. The displayed messages and notifications may have high contrast and visibility so that the customer service representative will immediately see them. The recommended actions may include, without limitation, suggesting a new insurance policy to the prospect, suggesting a policy change to add one or more additional product lines to the prospect's current policy, or transferring the prospect to a different customer service representative or supervisor. For example, if the computer system 102 determines that the calling prospect is a good candidate for an updated policy including new insurance product lines, the computer system 102 may notify the customer service representative, via computer system 108, to suggest the updated policy to the prospect, or to transfer the prospect to a customer service representative specifically designated to sell updated insurance policies.

Figure 5:
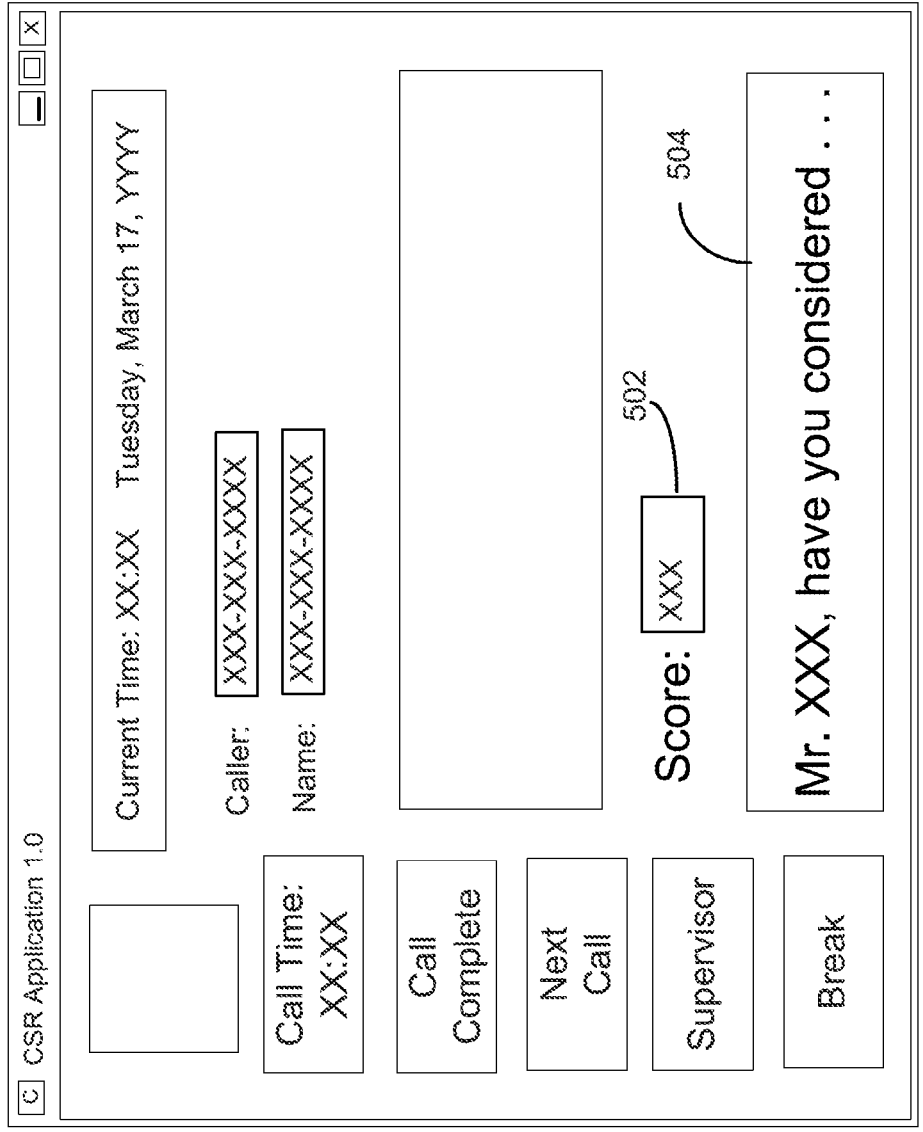
FIG. 5 depicts a user interface shown to a customer service representative processing an inbound prospect call, according to an illustrative embodiment of the invention.

FIG. 5 depicts a user interface 500 shown to a customer service representative processing an inbound prospect call, according to an illustrative embodiment of the invention. The user interface 500 is displayed on a customer service representative terminal 108a-b (FIG. 1), and is generated by the call center computer system 108 in conjunction with the insurer computer system 102. The user interface 500 includes a prospect score notification region 502 and a recommended action region 504. The prospect score notification region 502 displays the combined prospect score/ranking of the calling prospect, determined in step 408 of process 400 (FIG. 4) described above. The displayed prospect score/ranking may be in the form of a numerical value, a letter value, an individual or group rank, a color, a shape, or any other symbol capable of conveying the prospect score/ranking. Optionally, in addition to or instead of the combined prospect score/ranking, the prospect score notification region 502 may display one or more of an underwriting affinity score, determined in step 306 of process 300 (FIG. 3A), a prospect affinity score, determined in step 308 of process 300 (FIG. 3A), and/or a prospect context score, determined in step 310 of process 300 (FIG. 3A). In some embodiments, particular components of any of the scores may also be displayed separately by the prospect score notification region 502. For example, the prospect score notification region 502 may display a combined score including the underwriting affinity score and the prospect affinity score, and separately display the prospect context score. As described above, in relation to step 410 of process 400 (FIG. 4), the computer system 108 may also provide recommended actions to the customer service representative. These recommended actions may be displayed in the recommended action region 504, which may show actual recommended actions (e.g., "transfer to a supervisor by clicking on the supervisor button to the left") and/or may display a script to the customer service representative to read to the calling prospect (e.g., "Mr. XXX, we are pleased to be able to offer you excellent rates on a new insurance policy for . . . ").

Figure 6:
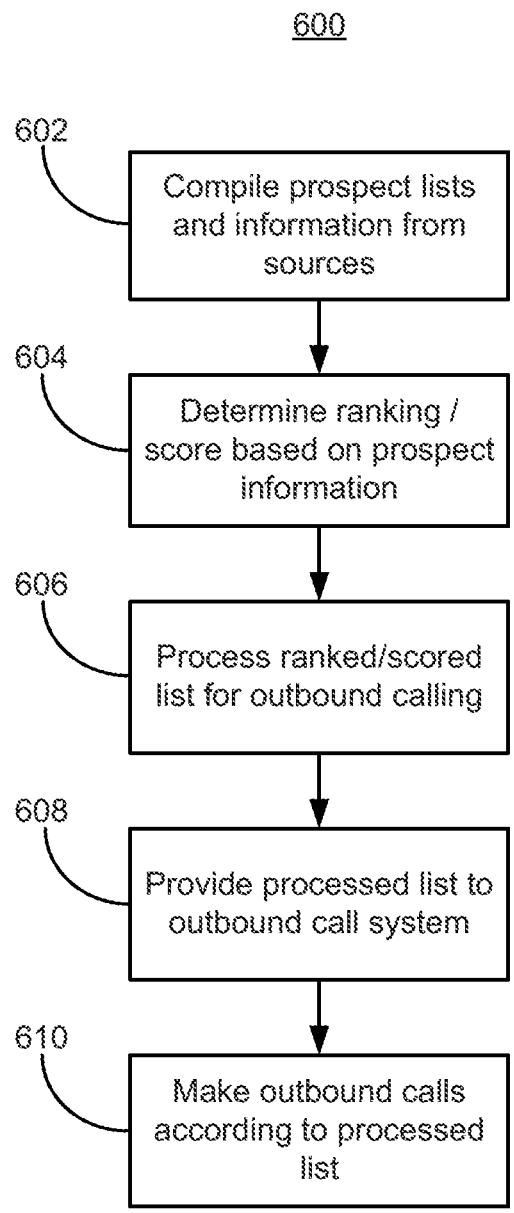
FIG. 6 is a flowchart depicting a workflow process for outbound prospect calls, according to an illustrative embodiment of the invention.

FIG. 6 is a flowchart depicting a workflow process 600 for outbound prospect calls, according to an illustrative embodiment of the invention. Workflow process 600 may be performed by computer system 102 (FIG. 1), or a CPU 202 (FIG. 2) in the computer system 102, in conjunction with outbound call system 112 (FIG. 1). In step 602, the computer system 102 compiles prospect lists and information from one or more sources. These sources include, without limitation, internal databases, external databases, leads provided by partners or other third-party agencies, and leads collected through marketing approaches, as described above in relation to FIG. 3A. The compiled prospect lists and information are then used by the computer system 102 or a predictive model executing on computer system 102 to score and/or rank the prospects in step 604, as described above in relation to FIG. 3A. In step 606, the list of scored/ranked prospects resulting from step 604 is further processed in preparation for the outbound calling process. For example, if the outbound call system 112 is associated with call centers in different geographic locations, the list of ranked prospects may also be divided by geographical location for distribution to the different call centers. As another example, information from the field ("field intelligence") or operator/supervisor preference may be used to redistribute or re-rank the prospects on the list.

After the prospect list(s) have been processed in step 606, they are distributed to the outbound call system 112 (step 608), which then proceeds to make the outbound calls according to the processed prospect list(s) (step 610). For example, if the prospects on the processed prospect list(s) are arranged in order of importance or likelihood of purchasing a policy, the outbound call system 112 may make the outbound calls to the prospects that are most important/most likely to purchase a policy first, before making the calls to the prospects that are less important/less likely to purchase a policy.

Figure 7:
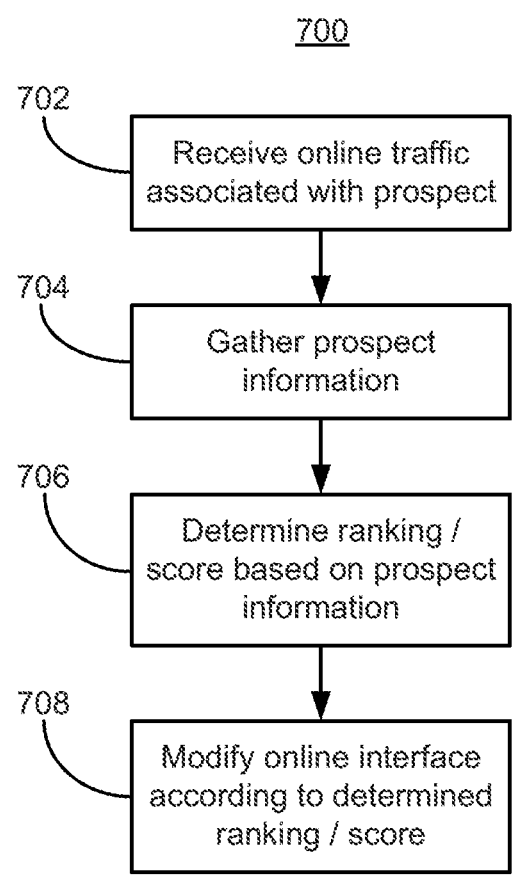
FIG. 7 is a flowchart depicting a workflow process for online prospect interactions, according to an illustrative embodiment of the invention.

FIG. 7 is a flowchart depicting a workflow process 700 for online prospect interactions, according to an illustrative embodiment of the invention. Workflow process 700 may be performed by computer system 102, in conjunction with a web server 110, both described in FIG. 1. In step 702, the computer system 102 receives online traffic associated with a prospect. For example, a potential insurance prospect may visit the webpage of the insurer, hosted/served on the web server 110, and select an online option to price a quote for an insurance policy. The web server 110 then forwards the online traffic information to the computer system 102. In step 704, the computer system 102 gathers relevant information about the prospect, via the web server 110 or through other sources, such as internal and/or external databases. For example, in the example above, the computer system 102 may instruct the web server 110 to present an online form to the potential insurance prospect after selecting the option to price a quote for a policy. Optionally, the computer system 102 may automatically gather information about the prospect via, for example, the IP address the prospect is using to access the insurer's webpage, which may be associated with the prospect's geographic location. In some embodiments, if the prospect has a pre-existing account or policy with the insurance company, the prospect may log into an online account or profile via the webpage. In these embodiments, the computer system 102 can retrieve information about the prospect from their online account/profile information. Similarly, if an agent is interacting with the insurance company webpage/web server 110 on behalf of a prospect, or if the prospect is interacting with the insurance company webpage/web server 110 via a third-party website, such as an insurance aggregator, the computer system 102 may retrieve information about the prospect from their online accounts and/or profiles associated with the agent or the third-party website. In other embodiments, the computer system 102 and web server 110 may be able to use cookie files or other files on the prospect's computer system to obtain prospect information.

In step 706, the computer system 102 uses the prospect information gathered in step 704 to determine prospect rankings and/or scores according to the process 300, described above in relation to FIG. 3A. Then, in step 708, the computer system 102, via web server 110, modifies the online interface presented to the prospect, for example by presenting or modifying a notification area, as described below, in relation to FIG. 8.

Figure 8:
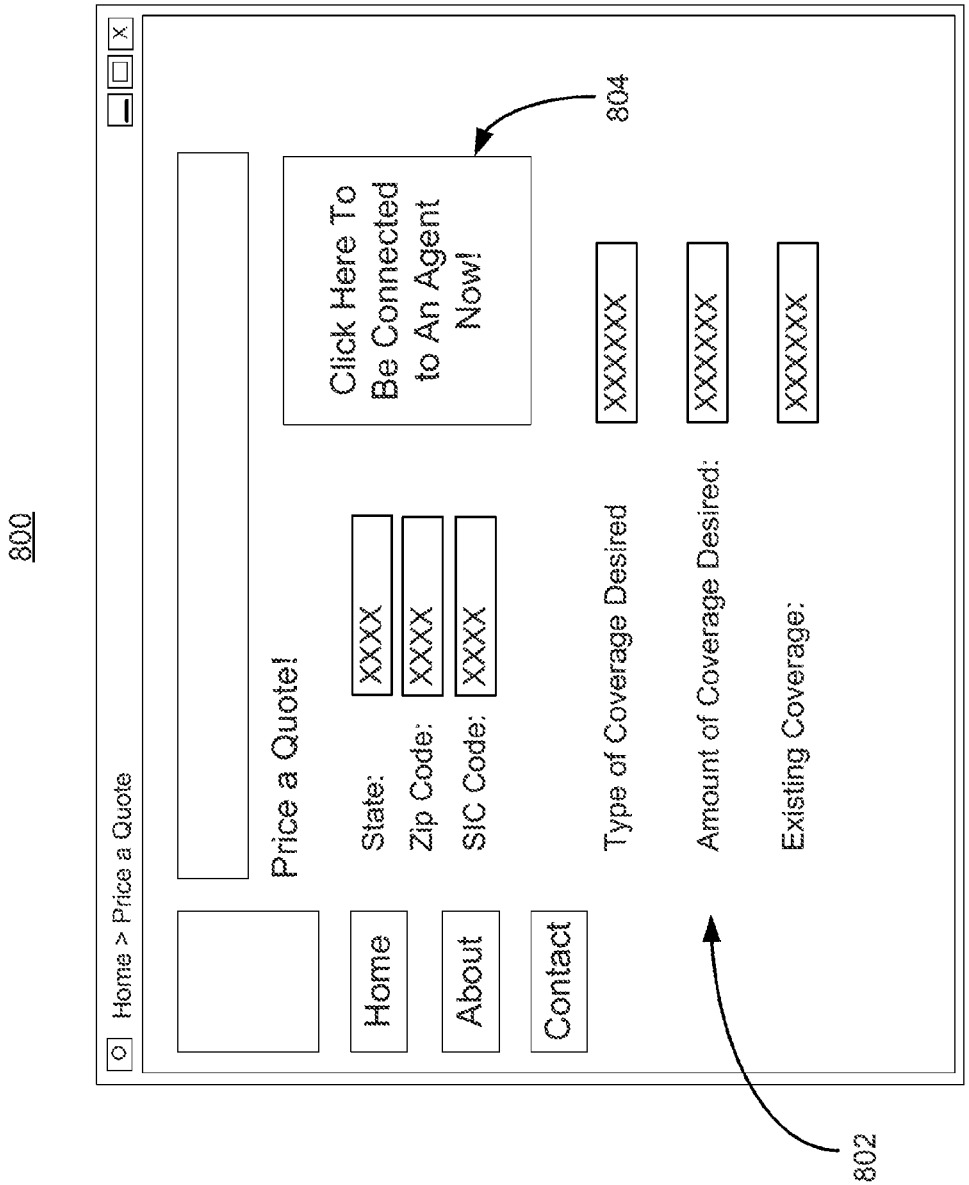
FIG. 8 depicts an online webpage shown to an online prospect, according to an illustrative embodiment of the invention.

FIG. 8 depicts an online webpage 800 presented to an online prospect, according to an illustrative embodiment of the invention. The online webpage 800 may be presented to the online prospect via web server 110 (FIG. 1). The online webpage 800 includes at least one data entry region 802 and at least one notification region 804. As discussed above, the computer system 102 may instruct the web server 110 to present an online form to the prospect, which may include the data entry region 802. The computer system 102 may also control the presentation of the notification region 804, which may include text, graphics, and/or icons, as a result of step 708 in the workflow process 700 (FIG. 7). The notification region 804 may include one or more links. These links may lead to different webpages, or may activate other online applications. In the example shown in FIG. 800, if the prospect clicks on the notification region 804, the web server 110 may operate in conjunction with customer service representative system 108 to launch an online call or chat application, so that a live customer service representative can interact with the prospect.

The notifications, information, and links that appear in the notification region 804 can be based on the prospect ranking and/or scores determined in step 706. For example, if the computer system 102 determines that the prospect score/rank is high (i.e., a high likelihood that the insurer will write a new/updated policy and/or a high likelihood that the prospect will accept the policy), the notifications/links that appear in the notification region 804 may be selected to facilitate the policy issuance process, such as an invitation to be connected directly to a customer service representative, via a voice call or an online chat.

In some embodiments, in order to comply with customer privacy law, third-party agents may not be able to provide prospect information directly to an insurer for insurance vetting purposes. At the same time, an insurer, principally responsible for developing and refining the predictive models that generate the scores described and discussed above in relation to process 300 in FIG. 3A, above, may not want the predictive models, methodologies, and data to be exposed to the third-party agents. A suitable arrangement in these embodiments is a black-box model, where the insurer provides the predictive models and scoring algorithms in the form of a single, monolithic software module to the third-party agents, who are unable to directly observe the predictive models and scoring algorithms used in the software. However, although the third-party agents cannot observe the inner workings of the black-box software module, they are free to execute the software module on their local computer servers, with access to prospect information stored on their local databases. The black-box software module executes the predictive models and scoring algorithms with the third-party agent prospect information, and generates ranked lists of prospects with accompanying combined scores, which are then provided to the insurer. Thus, the third-party agents are unable to examine the exact predictive models and scoring algorithms used by the black-box software module, and the insurer never has direct access to the prospect information stored in the third-party agent databases. In some embodiments, the black-box software module also executes the predictive models and scoring algorithms with data provided by the insurer. In these embodiments, the black-box software module may also prevent the third-party agents from accessing the insurer data.

Figure 9:
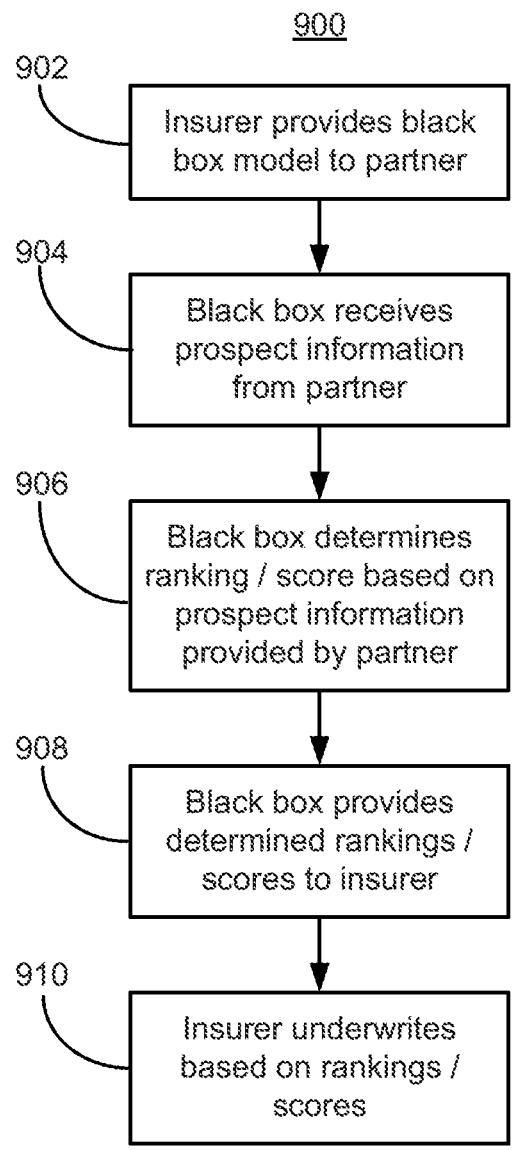
FIG. 9 is a flowchart depicting a workflow process for integrating third-party agents, according to an illustrative embodiment of the invention.

FIG. 9 is a flowchart depicting a workflow process 900 for integrating third-party agents, according to an illustrative embodiment of the invention. In step 902, the insurer provides the black-box software module to the third-party agent. The software module may be provided as instructions on a computer-readable medium provided to the third-party agent, or may be downloadable by the third-party agent from an insurer database or web server, such as web server 110 (FIG. 1). The software module may be provided as already-compiled executable files, or may be provided in an encrypted, encapsulated format that allows the software to be compiled on a third-party agent computer system, such as third-party computer system 106 (FIG. 1) without allowing the third-party agent to view its contents. In step 904, the black-box software module operates on the third-party agent server computer system 106 (FIG. 1) with prospect information provided by databases on the third-party computer system 106. The black-box software module determines prospect rankings, lists, and scores with the process 300 described above in relation to FIG. 3A and based on the prospect information provided by the third-party computer system 106 (step 906). The black-box software module then provides the determined prospect rankings and scores to the insurer, and optionally to the third-party agent as well (step 908).

The invention may be embodied in other specific forms without departing from the spirit or essential characteristics thereof. The foregoing embodiments are therefore to be considered in all respects illustrative, rather than limiting of the invention.

What is claimed is:

1. A data processing system for an insurance company to adjust an insurance process, comprising:
   a database stored in one or more data storage devices; and
   at least one processor in communication with the database and configured to:
   receive identification of at least one prospect;
   retrieve information associated with the at least one prospect from the database;
   determine, based on the retrieved information associated with the at least one prospect, a likelihood that an insurance offer will be made to the at least one prospect and a likelihood that the at least one prospect will accept the insurance offer; and
   adjust an insurance workflow process based on the determined likelihood that the insurance offer will be made and the determined likelihood that the at least one prospect will accept the insurance offer.

2. The system of claim 1,
   wherein the at least one processor is further configured to determine a combined prospect score based at least partly on both the likelihood that the insurance offer will be made and the likelihood that the at least one prospect will accept the insurance offer; and
   wherein the at least one processor being configured to adjust the insurance workflow process based on the likelihood that the insurance offer will be made and the likelihood that the at least one prospect will accept the insurance offer comprises the at least one processor being configured to adjust the insurance workflow process based on the combined prospect score.

3. The system of claim 2,
   wherein the at least one processor is further configured to determine a context score based on the retrieved information associated with the at least one prospect; and
   wherein the combined prospect score is further based at least partly on the context score in addition to the likelihood that the insurance offer will be made and the likelihood that the at least one prospect will accept the insurance offer.

4. The system of claim 3, wherein the context score is based on one or both of retrieved information from the database representative of a timeliness of the insurance offer and retrieved information from the database representative of a warmness of the insurance offer.

5. The system of claim 4, wherein the retrieved information from the database representative of the timeliness of the insurance offer comprises data relating to one or more of policy renewal dates and policy expiration dates.

6. The system of claim 4, wherein the retrieved information from the database representative of the warmness of the insurance offer comprises data relating to one or more of customer satisfaction scores, instances of positive service, sales activity within a time window, favorable audit results, timely payment of claims, full payment of claims, requests for additional insurance coverage, requests for upward adjustment of existing policy limits, and requests for upward adjustment of existing deductible levels.

7. The system of claim 4, wherein the at least one processor is configured to determine the context score based on the retrieved information using a predictive model.

8. The system of claim 1, wherein the processor is further configured to determine the likelihood that an insurance offer will be made to the at least one prospect based on one or more of: insurance risk scores; appetite of the insurer to sell particular insurance products to particular industries in particular geographic locations; and characteristics of coverage limits and deductibles across one or more product lines.

9. A computerized method for an insurance company to adjust an insurance process, comprising:
receiving by one or more processors data indicative of identification of at least one prospect;
retrieving by the one or more processors data indicative of information associated with the at least one prospect from a database stored on one or more data storage devices in communication with the one or more processors;
determining, by the one or more processors, a likelihood that an insurance offer will be made to the at least one prospect and a likelihood that the at least one prospect will accept the insurance offer, based on the retrieved information associated with the at least one prospect; and
adjusting, by the one or more processors, an insurance workflow process based on the determined likelihood that the insurance offer will be made to the at least one prospect and the determined likelihood that the prospect will accept the insurance offer.

10. The method of claim 9,
further comprising determining, by the one or more processors, a combined prospect score based at least partly on the likelihood that the insurance offer will be made and the likelihood that the at least one prospect will accept the insurance offer; and
wherein adjusting, by the one or more processors, the insurance workflow process based on the determined likelihood that the insurance offer will be made and the determined likelihood that the prospect will accept the insurance offer comprises adjusting, by the one or more processors, the insurance workflow process based on the combined prospect score.

11. The method of claim 10, further comprising:
determining, using the one or more processors, a context score based on the retrieved information associated with the at least one prospect; and
wherein the combined prospect score determined using the one or more processors is further based at least partly on the context score in addition to the likelihood that the insurance offer will be made and the likelihood that the prospect will accept the insurance offer.

12. The method of claim 11, wherein the context score is based on one or both of retrieved information from the database representative of a timeliness of the insurance offer and retrieved information from the database representative of a warmness of the insurance offer.

13. The method of claim 12, wherein the retrieved information from the database representative of the timeliness of the insurance offer comprises data relating to one or more of policy renewal dates and policy expiration dates.

14. The method of claim 12, wherein the retrieved information from the database representative of the warmness of the insurance offer comprises data relating to one or more of customer satisfaction scores, instances of positive service, sales activity within a time window, favorable audit results, timely payment of claims, full payment of claims, requests for additional insurance coverage, requests for upward adjustment of existing policy limits, and requests for upward adjustment of existing deductible levels.

15. The method of claim 12, further comprising determining by the one or more processors the context score based on the retrieved information using a predictive model.

16. A non-transitory computer readable storage medium storing computer executable instructions, which, when executed by a processor, cause the processor to carry out a method of adjusting an insurance workflow, the method comprising:
receiving identification of at least one prospect;
retrieving information associated with the at least one prospect from a database stored on one more data storage devices in communication with the processor;
determining, based on the retrieved information associated with the at least one prospect, a likelihood that an insurance offer will be made to the at least one prospect and a likelihood that the at least one prospect will accept the insurance offer; and
adjusting an insurance workflow process based on the determined likelihood that the insurance offer will be made to the at least one prospect and the determined likelihood that the at least one prospect will accept the insurance offer.

17. The non-transitory computer readable storage medium of claim 16,
wherein the method further comprises determining a combined prospect score based at least partly on the likelihood that the prospect will accept the insurance offer and the likelihood that the prospect will accept the insurance offer; and
wherein adjusting the insurance workflow process based on the likelihood that the insurance offer will be made and the likelihood that the prospect will accept the insurance offer comprises adjusting the insurance workflow process based on the combined prospect score.

18. The non-transitory computer readable storage medium of claim 17,
wherein the method further comprises determining a context score based on the retrieved information; and
wherein the combined prospect score is based at least partly on the context score in addition to the likelihood that the insurance offer will be made and the likelihood that the prospect will accept the insurance offer.

19. The non-transitory computer readable storage medium of claim 18, wherein the context score is based on retrieved information representative of a timeliness of the insurance offer and retrieved information representative of whether a prospect attitude is appropriate for making the insurance offer to the prospect.

20. The non-transitory computer readable storage medium of claim 19, wherein the retrieved information representative of the timeliness of the insurance offer comprises data relating to one or more of policy renewal dates and policy expiration dates.

21. The non-transitory computer readable storage medium of claim 19, wherein the retrieved information representative of whether the prospect attitude is appropriate for making the insurance offer to the prospect comprises data relating to one or more of customer satisfaction scores, instances of positive service, sales activity within a time window, favorable audit results, timely payment of claims, full payment of claims, requests for additional insurance coverage, requests for upward adjustment of existing policy limits, and requests for upward adjustment of existing deductible levels.

* * * * *